US009731747B2

(12) United States Patent
Obayashi

(10) Patent No.: US 9,731,747 B2
(45) Date of Patent: Aug. 15, 2017

(54) STEERING WHEEL STRUCTURE

(71) Applicant: HONDA MOTOR CO., LTD., Tokyo (JP)

(72) Inventor: Yuya Obayashi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/116,731

(22) PCT Filed: Oct. 28, 2014

(86) PCT No.: PCT/JP2014/078567
§ 371 (c)(1),
(2) Date: Aug. 4, 2016

(87) PCT Pub. No.: WO2015/125349
PCT Pub. Date: Aug. 27, 2015

(65) Prior Publication Data
US 2016/0347345 A1 Dec. 1, 2016

(30) Foreign Application Priority Data
Feb. 21, 2014 (JP) .................................. 2014-032062

(51) Int. Cl.
*B60R 21/203* (2006.01)
*B62D 1/04* (2006.01)
*B60Q 5/00* (2006.01)

(52) U.S. Cl.
CPC .............. *B62D 1/04* (2013.01); *B60Q 5/003* (2013.01); *B60R 21/2037* (2013.01)

(58) Field of Classification Search
CPC .......................... B60Q 5/003; B60R 21/2037
See application file for complete search history.

(56) References Cited

U.S. PATENT DOCUMENTS

| 4,462,648 | A |   | 7/1984  | Fohl    |             |
|-----------|---|---|---------|---------|-------------|
| 5,584,501 | A | * | 12/1996 | Walters | B60R 21/203 |
|           |   |   |         |         | 280/728.2   |
| 6,036,223 | A | * | 3/2000  | Worrell | B60R 21/2035|
|           |   |   |         |         | 280/728.2   |

(Continued)

FOREIGN PATENT DOCUMENTS

| CN | 101676163 A | 3/2010 |
| CN | 102069838 A | 5/2011 |

(Continued)

OTHER PUBLICATIONS

International Search Report dated Jan. 27, 2015, issued in counterpart International Application No. PCT/JP2014/078567 (2 pages).

(Continued)

*Primary Examiner* — Faye M Fleming
(74) *Attorney, Agent, or Firm* — Westerman, Hattori, Daniels & Adrian, LLP

(57) ABSTRACT

This steering equipment component is retained on a steering wheel main unit (4) by a lock portion when, at the time of its attachment, pushed in the steering wheel main unit (4) by a predetermined stroke or longer. The steering wheel main unit (4) and the steering equipment component are each provided with an energizing portion, and the energizing portions energize a horn circuit (38) through their mutual contact. In attaching the steering equipment component, the energizing portions are configured to be in contact connection to each other until the steering equipment component is pushed in by the predetermined stroke or longer, and the contact connection between the energizing portions is configured to be interrupted when the steering equipment component is pushed in by the predetermined stroke or longer.

13 Claims, 6 Drawing Sheets

(56) References Cited

U.S. PATENT DOCUMENTS

| | | | | |
|---|---|---|---|---|
| 6,082,758 A * | 7/2000 | Schenck | ............... | B60Q 5/003 200/305 |
| 6,688,638 B2 * | 2/2004 | Schutz | ................. | B60Q 5/003 200/61.55 |
| 6,874,808 B2 * | 4/2005 | Marath | .............. | B60R 21/2037 280/728.2 |
| 7,464,959 B2 * | 12/2008 | Pillsbury, IV | ........ | B60Q 5/003 200/61.55 |
| 8,342,567 B2 * | 1/2013 | Sasaki | ................ | B60R 21/2037 200/61.55 |
| 8,500,156 B2 * | 8/2013 | Banno | ................ | B60R 21/2037 280/728.2 |
| 2006/0208470 A1 | 9/2006 | Tsujimoto et al. | | |

FOREIGN PATENT DOCUMENTS

| | | |
|---|---|---|
| JP | 2515080 Y | 10/1996 |
| JP | 2870799 B | 3/1999 |
| JP | 2001-273827 A | 10/2001 |
| JP | 2007-50876 A | 3/2007 |

OTHER PUBLICATIONS

Notice of Allowance dated Mar. 14, 2017, issued in counterpart Japanese Application No. 2016-503932, with English translation. (6 pages).

Office Action dated May 4, 2017, issued in counterpart Chinese Application No. 201480074112.X, with partial English translation of Search Report. (6 pages).

* cited by examiner

STEERING WHEEL STRUCTURE

TECHNICAL FIELD

The present invention relates to a steering wheel structure of a vehicle.

The present application claims priority based on Japanese Patent Application No. 2014-032062 filed on Feb. 21, 2014, the contents of which are incorporated herein by reference.

BACKGROUND ART

In a steering wheel of a vehicle, a steering equipment component such as a horn block is attached to a steering wheel main unit that is supported by a steering shaft.

In attaching the steering equipment component, good workability and easiness with which it is attached to the steering wheel main unit are desired. Therefore, a variety of steering wheel structures are devised (for example, see Patent Document 1).

In a steering wheel structure described in Patent Document 1, a horn block as a steering equipment component is protrudingly provided with attachment pins, and a steering wheel main unit is provided with a pin reception portion that receives a front end portion of the attachment pin. A shaft portion of the attachment pin is provided with an engaging recess portion that opens in an outer circumferential direction. In the pin reception portion, there is provided an escape restriction member that goes into the engaging recess portion of the attachment pin through a spring force when the front end portion of the attachment pin is inserted by a predetermined amount or greater. Furthermore, between the horn block and the steering wheel main unit, there is interposed a return spring that imparts to the horn block a reactive force in a direction of spacing away.

In this steering wheel structure, when the horn block is attached to the steering wheel main unit, the horn block is positioned with respect to the steering wheel main unit, and in this condition, the horn block is pushed in while resisting the reactive force of the return spring. At this time, when the front end portions of the attachment pins are inserted into the corresponding pin reception portions by a predetermined amount or greater, the escape restriction member goes into the engaging recess portion of the attachment pin through its own spring reactive force. As a result, an escape of the horn block is restricted.

RELATED ART DOCUMENT

Patent Document

Patent Document 1: Japanese Unexamined Patent Application, First Publication No. 2007-050876

SUMMARY

Problems to be Solved by the Invention

However, in the aforementioned steering wheel structure, in attaching the steering equipment component (horn block), it is difficult to check whether the steering equipment component is securely locked on the steering wheel main unit or not. Especially in the case where the lock portion (the engaging recess portion and the escape restriction member) is in a part that is hidden behind the steering equipment component, it is not possible to do the visual checking.

Aspects of the present invention provide a steering wheel structure in which in attaching a steering equipment component, it is possible to easily check that the steering equipment component is securely locked on the steering wheel main unit.

Means for Solving the Problem

To solve the aforementioned problem, the steering wheel structure according to the present invention has adopted the following.

(1) A steering wheel structure according to an aspect of the present invention includes: a steering wheel main unit that is supported by a steering shaft; a horn circuit that sounds a warning sound at a time of a horn operation; and a steering equipment component that is to be attached to the steering wheel main unit, wherein the steering wheel main unit and the steering equipment component are provided with a lock portion with which the steering equipment component is retained on the steering wheel main unit when, in attaching the steering equipment component, the steering equipment component is pushed in the steering wheel main unit by a predetermined stroke or longer, wherein the steering wheel main unit and the steering equipment component are each provided with an energizing portion, the energizing portions energize the horn circuit through mutual contact thereof, and wherein the lock portion is provided with a contact structure in which in attaching the steering equipment component, the energizing portions are in contact connection to each other until the steering equipment component is pushed in by the predetermined stroke or longer, and in which the contact connection between the energizing portions is interrupted when the steering equipment component is pushed in by the predetermined stroke or longer.

As a result, in attaching the steering equipment component, when the steering equipment component is pushed in to a predetermined position of the steering wheel main unit, the energizing portion on the steering equipment component side and the energizing portion on the steering wheel main unit side are in contact with each other to cause the horn circuit to sound a warning sound of the horn until the steering equipment component is pushed in by a predetermined stroke or longer. In this condition, when the steering equipment component is pushed in by the predetermined stroke or longer, the steering equipment component is retained on the steering wheel main unit by the lock portion, and also the contact connection between the energizing portions are released to halt the warning sound of the horn. With this, it is possible for the operator to learn that the steering equipment component is securely retained on the steering wheel main unit.

(2) In the steering wheel structure as set forth above in (1), the lock portion may include: an attachment pin that is protrudingly provided through a first of the steering equipment component and the steering wheel main unit; and a pin reception portion that is provided in a second of the steering equipment component and the steering wheel main unit and receives a front end portion of the attachment pin; a shaft portion of the attachment pin may have: an engaging recess portion that opens to an outer circumferential side of the shaft portion; and a guide wall portion that is arranged so as to be adjacent to a shaft front end side of the engaging recess portion; the pin reception portion may be provided with an escape restriction member that, in attaching the steering equipment component, is in abutment with the guide wall portion until the steering equipment component is pushed in by the predetermined stroke or longer, and that goes into the engaging recess portion to restrict the attachment pin from escaping when the steering equipment component is pushed in by the predetermined stroke or longer; the attachment pin and the escape restriction member may be formed of a conductive material and may function as the energizing portion; and in the engaging recess portion, an insulating material may be arranged.

In this case, in attaching the steering equipment component, until the steering equipment component is pushed in by a predetermined stroke or longer, the escape restriction member of the pin reception portion is in contact with the guide wall of the attachment pin to cause the horn circuit to sound a warning sound of the horn. In this condition, when the steering equipment component is pushed in by the predetermined stroke or longer, the escape restriction member of the pin reception portion goes into the engaging recess portion of the attachment pin. This restricts the steering equipment component from escaping and also releases the contact connection between the energizing portions to halt the warning sound of the horn.

(3) In the steering wheel structure as set forth above in (2), the guide wall portion may be formed in a tapered shape whose diameter reduces toward a front end side of the shaft portion of the attachment pin; the escape restriction member may be biased in a direction that crosses an entry orbit of the attachment pin when the steering equipment component is attached; and between the steering equipment component and the steering wheel main unit, a reactive force imparting device may be provided that imparts a reactive force that resists the push-in of the steering equipment component.

In this case, the steering equipment component is positioned with respect to the steering wheel main unit, and the escape restriction member of the pin reception portion is brought into abutment with the taper-like guide wall of the attachment pin. In this condition, when the steering equipment component is pushed in while resisting the force of the reactive force imparting device, the escape restriction member of the attachment pin is guided by the guide wall of the attachment pin to be pushed and moved in a direction of spacing away from the entry orbit of the attachment pin. Thus, when the steering equipment component is pushed in by the predetermined stroke or longer, the escape restriction member is moved into the engaging recess portion of the attachment pin by the biasing force. Therefore, it is possible to easily attach the steering equipment component to the steering wheel main unit.

(4) In steering wheel structure as set forth above in (1), a first of the steering equipment component and the steering wheel main unit may be protrudingly provided with: a first attachment pin in which a rubber elastic body is interposed partly in an axial direction; and a second attachment pin whose whole area in the axial direction is formed of a conductive material; a second of the steering equipment component and the steering wheel main unit may be provided with: a first pin reception portion that receives a front end portion of the first attachment pin; and a second pin reception portion that receives a front end portion of the second attachment pin; a pair of the first attachment pin and the first pin reception portion, and a pair of the second attachment pin and the second pin reception portion each may function as the lock portion; a shaft portion of the second attachment pin may have: an engaging recess portion that opens to an outer circumferential side of the shaft portion; and a guide wall portion that is arranged so as to be adjacent to a shaft front end side of the engaging recess portion; the second pin reception portion may be provided with an escape restriction member that, in attaching the steering equipment component, is in abutment with the guide wall portion until the steering equipment component is pushed in by the predetermined stroke or longer, and that goes into the engaging recess portion to restrict the second attachment pin from escaping when the steering equipment component is pushed in by the predetermined stroke or longer; and the escape restriction member may be formed of a conductive material and may function together with the second attachment pin as the energizing portions, and also the escape restriction member may cause a contact connection to the second attachment pin to be interrupted when having gone into the engaging recess portion of the second attachment pin.

In this case, in attaching the steering equipment component, until the steering equipment component is pushed in by a predetermined stroke or longer, the escape restriction member of the second pin reception portion is in contact with the guide wall of the second attachment pin to cause the horn circuit to sound a warning sound of the horn. In this condition, when the steering equipment component is pushed in by the predetermined stroke or longer, the pair of the first attachment pin and the first pin reception portion, and the pair of the second attachment pin and the second pin reception portion both restrict the steering equipment component from escaping. On the other hand, the escape restriction member of the second pin reception portion goes into the engaging recess portion of the second attachment pin. This releases the contact connection between the energizing portions to halt the warning sound of the horn.

(5) In the steering wheel structure as set forth above in (4), in the escape restriction member of the second pin reception portion that has gone into the engaging recess portion of the second attachment pin, when the steering equipment component is displaced in an escape direction further than an escape restriction position formed by the first attachment pin and the first pin reception portion, a wall of the engaging recess portion of the second attachment pin and the escape restriction member of the second pin reception portion may be brought into abutment with each other.

In this case, when the steering equipment component is largely displaced in the escape direction further than the escape restriction position formed by the first attachment pin and the first pin reception portion, the escape restriction member of the second pin reception portion is brought into abutment with a wall of the engaging recess portion of the second attachment pin. This restricts an excessive displacement of the steering equipment component in the escape direction.

(6) In the steering wheel structure as set forth above in (4) or (5), in a default state in which the steering equipment component is attached to the steering wheel main unit, the second attachment pin and the second pin reception portion may be in a non-contact state.

In this case, in the default state, the steering equipment component is supported by the steering wheel main unit via the rubber elastic body of the first attachment pin. As a result, with the mass of the steering equipment component and the spring characteristic of the rubber elastic body being properly set, the steering equipment component together with the rubber elastic body functions as a dynamic damper that decreases a vibration of the steering wheel.

(7) In the steering wheel structure as set forth above in any one of (4) to (6), a shaft portion of the first attachment pin may have: an engaging recess portion that opens to an outer circumferential side of the shaft portion; and a guide wall portion that is arranged so as to be adjacent to a shaft front end side of the engaging recess portion; the guide wall portion of each of the first attachment pin and the second attachment pin may be formed in a tapered shape whose diameter decreases toward a front end side of each shaft portion; the first pin reception portion may be provided with an escape restriction member that, in attaching the steering equipment component, is in abutment with the guide wall portion of the first attachment pin until the steering equipment component is pushed in by the predetermined stroke or longer, and that goes into the engaging recess portion of the first attachment pin to restrict the first attachment pin from escaping when the steering equipment component is pushed in by the predetermined stroke or longer; the escape restriction member of the first pin reception portion may be biased in a direction that crosses an entry orbit of the first attachment pin when the steering equipment component is attached; the escape restriction member of the second pin reception portion may be biased in a direction that crosses an entry orbit of the second attachment pin when the steering equipment component is attached; and between the steering equipment component and the steering wheel main unit, reactive force imparting devices may be provided that impart a reactive force that resists the push-in of the steering equipment component.

In this case, the steering equipment component is positioned with respect to the steering wheel main unit and the escape restriction member of the first pin reception portion is brought into abutment with the taper-like guide wall of the first attachment pin. At the same time, the escape restriction member of the second pin reception portion is brought into abutment with the taper-like guide wall of the second attachment pin. In this condition, when the steering equipment component is pushed in while resisting the force of the reactive force imparting devices, the escape restriction member of the first pin reception portion is guided by the guide wall of the first attachment pin to be pushed and moved in a direction of spacing away from the entry orbit of the first attachment pin, and at the same time, the escape restriction member of the second pin reception portion is guided by the guide wall of the second attachment pin to be pushed and moved in a direction of spacing away from an entry orbit of the second attachment pin. Thus, when the steering equipment component is pushed in by a predetermined stroke or longer, the escape restriction members are moved into the engaging recess portions of the corresponding attachment pins by the biasing force. Therefore, it is possible to easily attach the steering equipment component to the steering wheel main unit.

(8) In the steering wheel structure as set forth above in any one of (1) to (7), the steering equipment component may be a horn block in which a horn operation portion and an airbag module are assembled.

Advantage of the Invention

According to the aspects of the present invention, in attaching the steering equipment component, when the steering equipment component is pushed in by a predetermined stroke or longer, a contact connection between the energizing portions, which energizes the horn circuit, is released to halt a warning sound. Therefore, it is possible to easily check that the steering equipment component is securely locked on the steering wheel main unit.

DESCRIPTION OF THE EMBODIMENTS

Hereunder is a description of embodiments of the present invention, based on the drawings.

Firstly, a first embodiment shown in FIG. 1 to FIG. 4 will be described.

Figure 1:
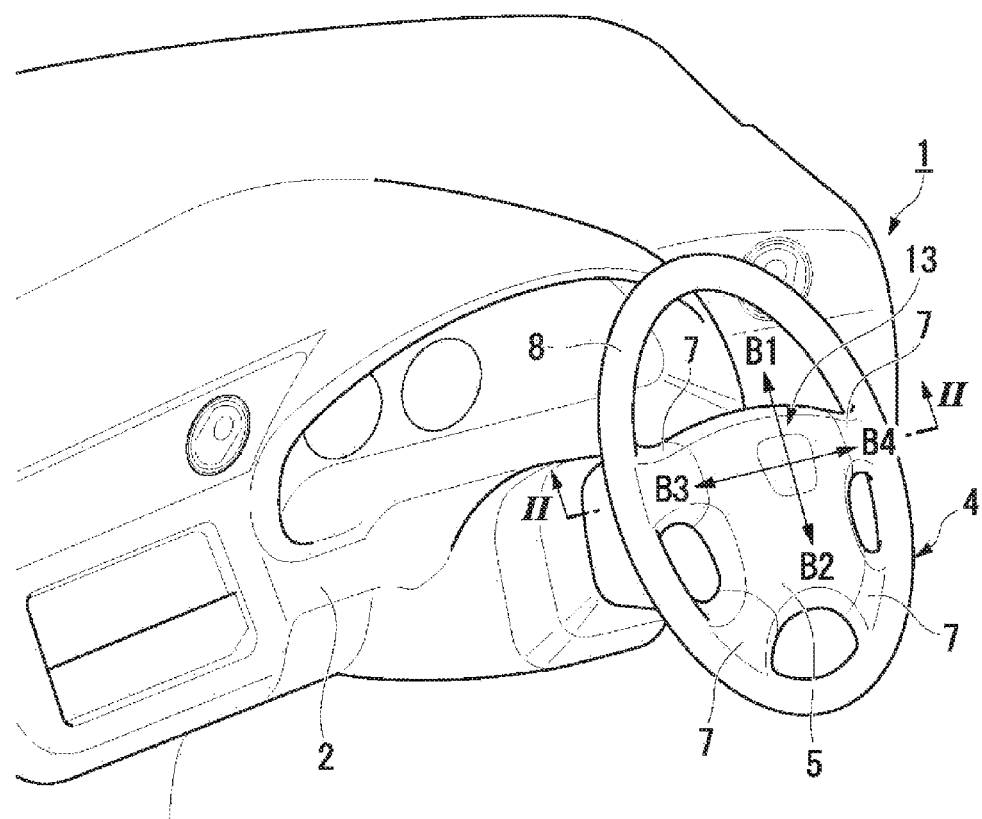
FIG. 1 is a perspective view showing an interior of a vehicle.
Figure 2:
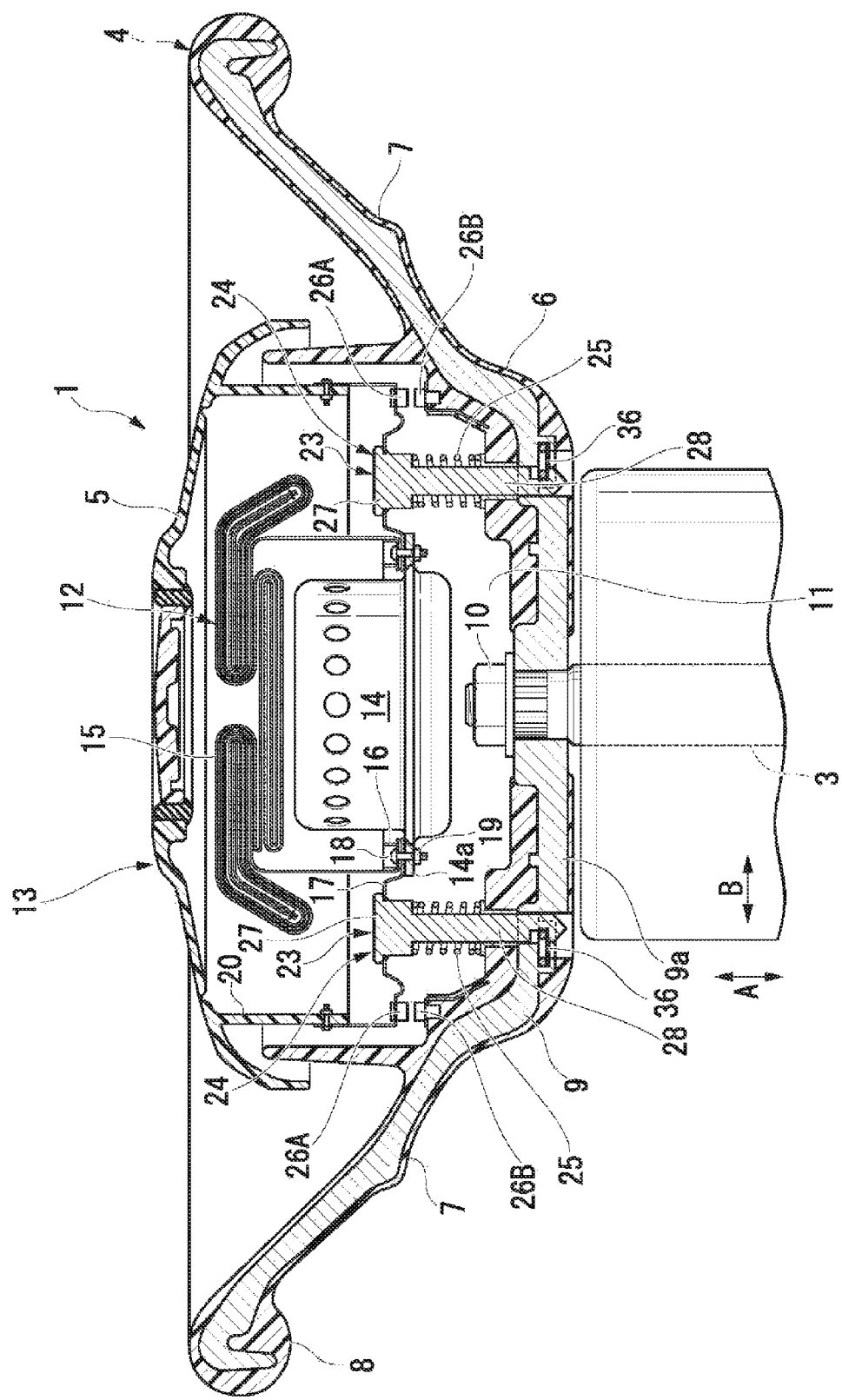
FIG. 2 is a cross-sectional view of a steering wheel according to a first embodiment of the present invention, which corresponds to a II-II cross-section of FIG. 1.

FIG. 1 is a diagram showing a driver's seat in an interior of a vehicle. FIG. 2 is a cross-sectional view of a steering wheel 1 that corresponds to a II-II cross-section of the driver's seat of FIG. 1.

As shown in these figures, in the steering wheel 1, a steering wheel main unit 4 that is held by a driver is attached to a front end of a steering shaft 3 that protrudes from an instrument panel 2 in a rearward direction on an interior side. A steering pad 5 as a horn operation portion is arranged in a central area of the steering wheel main unit 4.

Note that, in the following description, an axial direction means a longitudinal direction of the steering shaft 3 that is denoted with a direction of an arrow A in the figures unless otherwise specified. Similarly, orthogonal-to-axis directions mean directions orthogonal to the longitudinal direction of the steering shaft 3 that are denoted with directions of arrows B1 to B4 in the figures unless otherwise specified.

The steering wheel main unit 4 includes: a cover portion 6 at the center (see FIG. 2); a plurality of spoke portions 7 that extend outwardly in a radial direction from a circumference of the cover portion 6; and an annular rim portion 8 that is linked to extension ends of the spoke portions 7. Inside each of the cover portion 6, the spoke portions 7, and the rim portion 8, a core metal 9 is buried. An external side of the core metal 9 is covered with a synthetic resin. A boss portion 9a of the core metal 9 that is buried in the cover portion 6 is fitted onto a front end of the steering shaft 3 and is fastened and fixed with a nut 10.

Between the cover portion 6 at the center of the steering wheel main unit 4 and the rim portion 8 on the outer circumferential side, there is provided a concave-like space 11 that recesses in a rear direction of the vehicle body. In the concave-like space 11, there is arranged a horn block 13 in which an airbag module 12 and a steering pad 5 are integrated. In this embodiment, the horn block 13 functions as a steering equipment component.

As shown in FIG. 2, the airbag module 12 includes: an inflator 14 that produces a high-pressure gas; an airbag 15 that is arranged behind (on the interior side of) the inflator 14 in a folded manner; and a first retainer 16 and a second retainer 17 that sandwich an opening portion of the airbag 15. While vertically sandwiched between the first retainer 16 and the second retainer 17, an opening edge of the airbag 15 is fastened and fixed together with the first and second retainers 16, 17 to a flange portion 14a on an outer circumference of the inflator 14 by means of bolts 18 and nuts 19.

A rear surface (interior-side surface) of the airbag module 12 is covered with the steering pad 5, which is the horn operation portion. On an outer circumferential edge of the steering pad 5, there is protrudingly provided a connection wall 20 toward the front side. The connection wall 20 is fastened and fixed to an outer circumferential edge of the second retainer 17 by means of bolts and nuts (reference symbols omitted). Thus, the horn block 13, which is made of the airbag module 12 and the steering pad 5 being integrated, is locked on the core metal 9 of the steering wheel main unit 4 in a floating manner, by means of three floating support portions 23.

In the case of this embodiment, the floating support portions 23 are provided: two on the left and right sides on the upper portion; and one at the center of the lower portion, with the steering shaft 3 as the center. All the three have the same structure. Note that FIG. 2 shows the two floating support portions 23 on the left and right sides on the upper portion of the steering shaft 3.

The floating support portion 23 includes: an attachment pin 24 that attaches the horn block 13 to the steering wheel main unit 4 while a push-in displacement in the axial direction by the set stroke or longer for the horn block 13 is allowed; and a return spring 25 (reactive force imparting device) that biases the horn block 13 toward a default position. The attachment pin 24 has a base end portion (end portion positioned on the rear side of the vehicle body) locked on and fixed to the second retainer 17 of the horn block 13, and has a front end portion (end portion positioned on the front side of the vehicle body) locked on the cover portion 6 of the steering wheel main unit 4 in a retained state with a slight displacement in the axial direction allowed.

Furthermore, to positions of the second retainer 17 on the horn block 13 side and the cover portion 6 on the steering wheel main unit 4 side that are opposed to each other in the axial direction, there are respectively attached a pair of horn contacts 26A, 26B, which are used as a horn switch. Each pair of the horn contacts 26A, 26B is connected to a horn circuit 38 (see FIG. 3 and FIG. 4) that sounds a horn when energized. When the horn block 13 is biased by the return spring 25 to be in the vicinity of the default position, the horn contacts 26A, 26B are in a spaced state (non-contact state). In this condition, when the horn block 13 is pushed in by the set stroke or longer, then the horn contacts 26A, 26B are brought into contact with each other, to thereby activate the horn.

Figure 3:
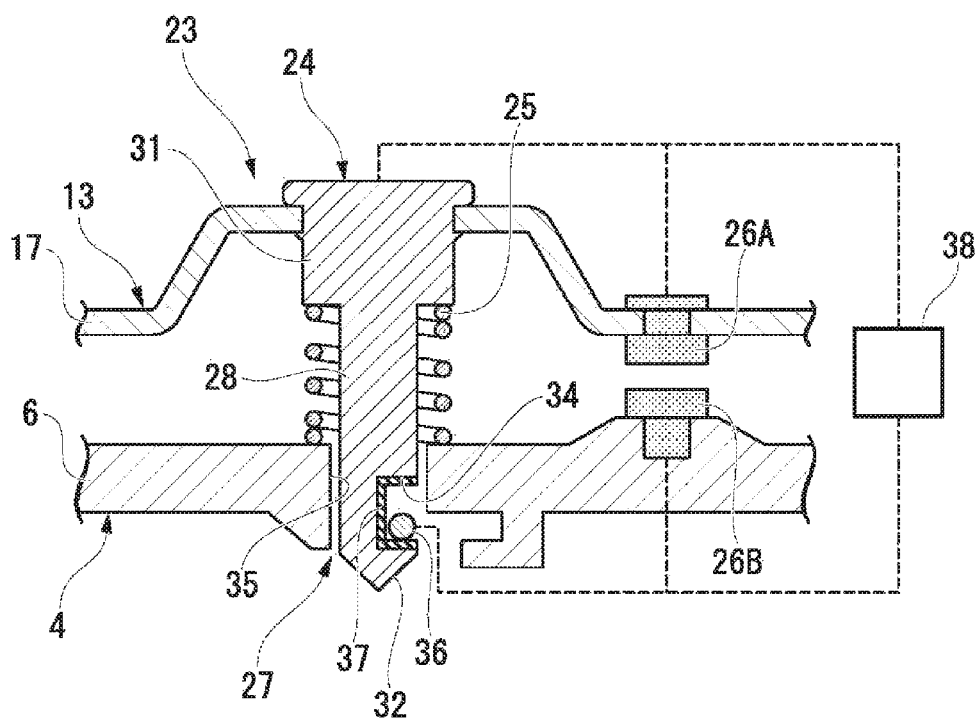
FIG. 3 is a schematic cross-sectional view for explaining a structure of the steering wheel according to the first embodiment of the present invention.
Figure 4:
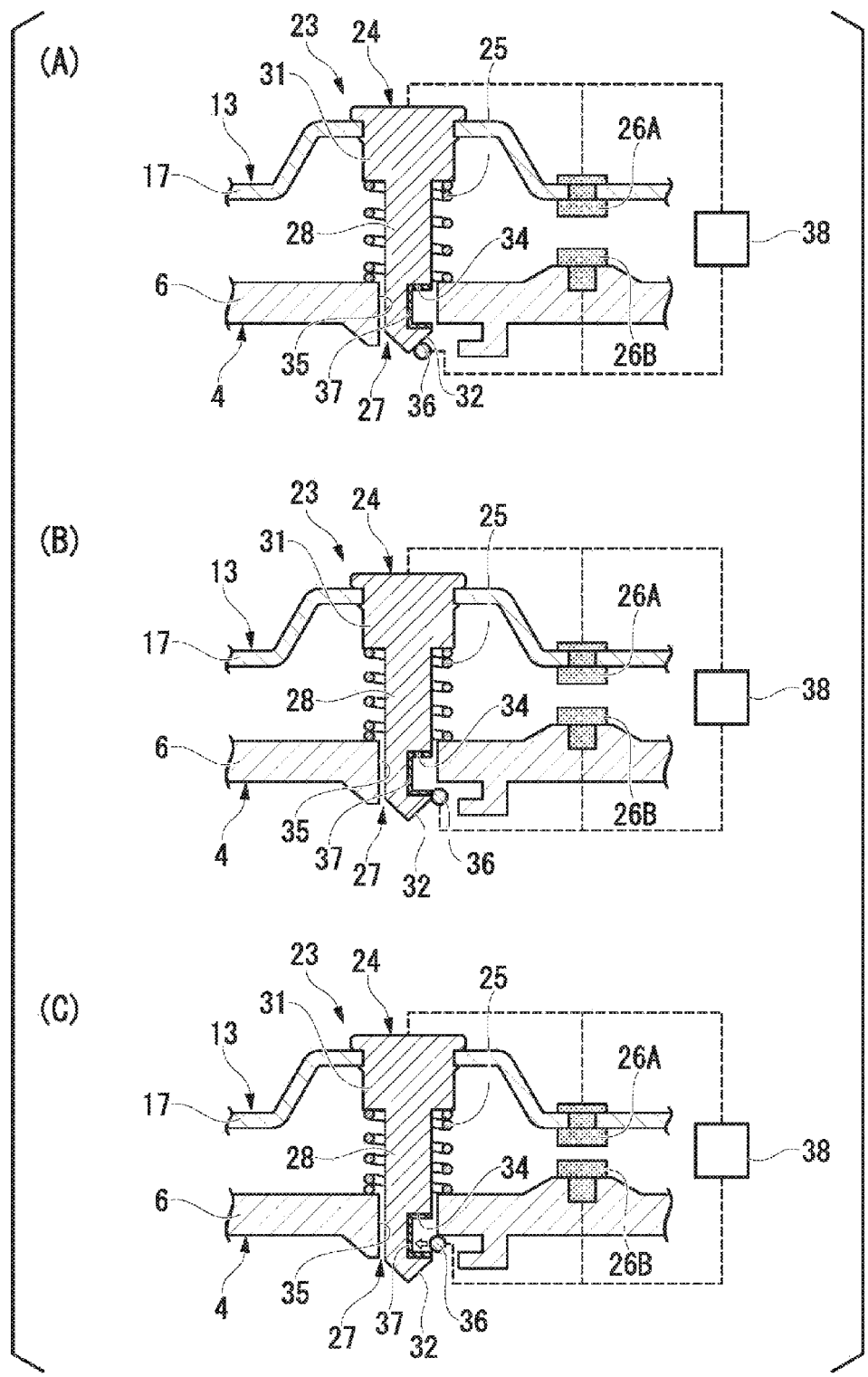
FIG. 4 are schematic cross-sectional diagrams showing how the steering wheel according to the first embodiment of the present invention is assembled, which is shown sequentially in (A), (B), and (C).

FIG. 3 is a schematic cross-sectional view of a part of the steering wheel 1, which shows a structure of the floating support portion 23.

As shown in the same figure, the attachment pin 24 has a base end portion 31 attached to the second retainer 17 of the horn block 13, and the front end portion thereof protrudes in a direction of the cover portion 6 of the steering wheel main unit 4. At each of the positions of the cover portion 6 that correspond to the attachment pins 24, there is provided a pin reception portion 27 that receives the front end portion of the corresponding attachment pin 24. In the case of this embodiment, the pin reception portion 27 includes: a support hole 35 into which the front end portion of the attachment pin 24 is inserted; and an escape restriction member 36 that restricts an escape of the attachment pin 24 from the support hole 35. Furthermore, in this embodiment, the attachment pin 24 and the pin reception portion 27 function as a lock portion that retains the horn block 13 on the steering wheel main unit 4.

In the attachment pin 24, the base end portion 31 that is fixed to the horn block 13 side is formed to have a large diameter, and a shaft portion 28 that protrudes from the base end portion 31 is formed to have a diameter smaller than that of the base end portion 31. On a front end side of the shaft portion 28, there is formed a taper portion 32 whose diameter reduces in a conical manner. In a part of the shaft portion 28 that is adjacent to an expanded diameter side of the taper portion 32, there is formed a notch groove 34 (engaging recess portion) that recesses in an orthogonal-to-axis direction.

In the case of this embodiment, the attachment pin 24 is generally made of a conductive metal material.

Furthermore, when the horn block 13 is attached to the steering wheel main unit 4, the taper portion 32 functions as a guide wall portion that guides the escape restriction member 36.

The escape restriction member 36 is made of, for example, a spring steel wire, and is arranged on a front surface (surface on the front side of the vehicle body) side of the cover portion 6. In a default state in which the escape restriction member 36 is attached to the cover portion 6, a part of the escape restriction member 36 is arranged so as to face an interior of the support hole 35. In attaching the horn block 13, when the front end portion of the attachment pin 24 is inserted into the support hole 35, the part is configured to be brought into abutment with the taper portion 32 of the attachment pin 24 through its own spring elasticity. Furthermore, when the attachment pin 24 thus goes into the support hole 35 by a predetermined amount or greater, the escape restriction member 36 elastically returns to its default shape in the notch groove 34 of the attachment pin 24, to thereby restrict the attachment pin 24 from escaping. The return spring 25 is arranged on an outer circumferential side of each attachment pin 24.

A groove width (width in a direction along the axial direction of the attachment pin 24) of the notch groove 34 is formed wider than an outer diameter of the escape restriction member 36. Therefore, in a state with the horn block 13 being attached to the steering wheel main unit 4, a displacement of the attachment pin 24 along its axial direction is allowed by a difference between the groove width of the notch groove 34 and the outer diameter of the escape restriction member 36. Furthermore, to an inner wall of the notch groove 34, there is attached an insulating material 37. In the case of this embodiment, the attachment pin 24 and the escape restriction member 36 function also as an energizing portion.

Furthermore, the attachment pin 24 and the escape restriction member 36, which are an energizing portion, are connected to the horn circuit 38. The attachment pin 24 and the escape restriction member 36 turn the horn circuit 38 to the ON state when they are in contact connection to each other (sound a horn), and turn the horn circuit 38 to the OFF state when their mutual contact connection is interrupted. However, in a state where the horn block 13 is properly attached to the steering wheel main unit 4, the insulating material 37 is interposed between the escape restriction member 36 and the attachment pin 24, as shown in FIG. 3. Therefore, the contact connection between the escape restriction member 36 and the attachment pin 24 is interrupted, to thereby maintain the horn circuit 38 in the OFF state.

FIGS. 4(A), (B), and (C) are diagrams showing how the attachment pin 24 and the pin reception portion 27 are in attaching the horn block 13. Below, attachment of the horn block 13 to the steering wheel main unit 4 will be described with reference to FIGS. 4(A), (B), and (C).

In attaching the horn block 13, firstly the horn block 13 is positioned with respect to the steering wheel main unit 4, and each attachment pin 24 protrudingly provided through the horn block 13 is inserted into the corresponding support hole 35 on the steering wheel main unit 4 side, as shown in FIG. 4(A). At this time, when the horn block 13 is pushed in a direction of the cover portion 6 of the steering wheel main unit 4, the taper portion 32 on the front end side of the attachment pin 24 passes through the support hole 35 while the return spring 25 arranged in a circumferential area of the attachment pin 24 is being compressed.

Thus, when the horn block 13 is further pushed in while resisting the reactive force of the return spring 25, the escape restriction member 36 is brought into abutment with the taper portion 32 on the front end side of the attachment pin 24 and then is displaced outwardly in a radial direction of the attachment pin 24 while being guided by the taper portion 32, as shown in FIGS. 4(A), (B). At this time, as for the escape restriction member 36, a spring reactive force toward a radially inward direction increases.

Furthermore, at this time, the escape restriction member 36 and the attachment pin 24 are brought into direct contact with each other. This turns the horn circuit 38 to the ON state to sound a horn.

In this condition, when the horn block 13 is pushed in by a predetermined strode or longer, the escape restriction member 36 is positioned in the notch groove 34 of the attachment pin 24 and then goes into the notch groove 34 through its own spring reactive force, as shown in FIG. 4(C). At this time, the insulating material 37 is arranged in the notch groove 34. Therefore, the direct contact between the escape restriction member 36 and the attachment pin 24 is interrupted to turn the horn circuit 38 to the OFF state. As a result, an operating sound of the horn is halted.

Therefore, an operator who attaches the horn block 13 learns, through this halt of the operating sound, that the escape restriction member 36 has gone into the notch groove 34, and securely restricts the horn block 13 from escaping from the steering wheel main unit 4.

As described above, in the steering wheel structure according to this embodiment, in attaching the horn block 13, the attachment pin 24 and the escape restriction member 36 are in contact connection to each other to sound a horn until the horn block 13 is pushed in by a predetermined stroke or longer, and the contact connection between the attachment pin 24 and the escape restriction member 36 is interrupted to halt the operating sound of the horn when the horn block 13 is pushed in by the predetermined stroke or longer. Therefore, it is possible for the operator to easily check that the horn block 13 is securely locked on the steering wheel main unit 4.

Especially, in this embodiment, it is possible to notify the operator of the fact that the horn block 13 is securely locked on the steering wheel main unit 4 by a halt of an operating sound. Therefore, even though the horn block 13 and the lock portion of the steering wheel main unit 4 are in a part that is hard to observe visually from outside, it is possible for the operator to securely check that the horn block 13 is locked. Furthermore, the steering wheel structure according to this embodiment is capable of check the locking by use of the horn circuits 38 provided in the steering wheel 1 without requiring a dedicated inspection apparatus. Therefore, it is possible to reduce facility costs.

Furthermore, in the steering wheel structure according to this embodiment, the shaft portion 28 of the attachment pin 24 is provided with: the notch groove 34 that opens to the outer circumferential side of the shaft portion 28; and the taper portion 32 that is arranged so as to be adjacent to a shaft front end side of the notch groove 34, and the pin reception portion 27 is provided with the escape restriction member 36 that goes into the notch groove 34 when, in attaching the horn block 13, the horn block 13 is pushed in by a predetermined stroke or longer. Therefore, in attaching the horn block 13, with a simple operation of linearly pushing the horn block 13 in while resisting the force of the return spring 25, it is possible to easily attach the horn block 13 to the steering wheel main unit 4. Furthermore, in the case of this embodiment, the insulating material 37 is arranged in the notch groove 34. Therefore, after the horn block 13 is attached, it is possible to prevent the attachment pin 24 and the escape restriction member 36 from being brought into contact connection to each other to sound a horn.

Note that between the horn circuit 38 and the attachment pin 24 as well as the escape restriction member 36, there may be interposed a selector switch, and that the selector switch may be turned to an energizing state only in attaching the horn block 13.

Subsequently, a second embodiment shown in FIG. 5 and FIG. 6 will be described. As for the second embodiment, the same parts as those of the first embodiment are denoted with the same reference symbols, and will not be repetitiously explained.

In a steering wheel structure of the second embodiment, there are provided a first floating support portion 23A and a second floating support portion 23B, which are slightly different in structure and function, between a horn block 13 and a steering wheel main unit 4.

In the first floating support portion 23A, a first attachment pin 24A in which a rubber elastic body 40 is interposed in a base end portion 31, is protrudingly provided through a horn block 13, and a steering wheel main unit 4 is provided with a first pin reception portion 27A that receives a front end portion of the first attachment pin 24A. In the second floating support portion 23B, a second attachment pin 24B, which is generally made of a conductive metal material, is protrudingly provided through the horn block 13, and the steering wheel main unit 4 is provided with a second pin reception portion 27B that receives a front end portion of the second attachment pin 24B.

Shaft portions 28 of the first attachment pin 24A and the second attachment pin 24B are respectively provided with: notch grooves 34A, 34B (engaging recess portions) that open to outer circumferential sides of the respective shaft portions 28; and taper portions 32A, 32B (guide wall portions) that are arranged so as to be adjacent respectively to shaft front end sides of the notch grooves 34A, 34B. Around outer circumferences of the first attachment pin 24A and the second attachment pin 24B, there are respectively arranged return springs 25A, 25B that impart a reactive force resisting a force in a push-in direction of the horn block 13.

The first pin reception portion 27A and the second pin reception portion 27B are provided respectively with escape restriction members 36A, 36B that, in attaching the horn block 13, are in abutment respectively with the taper portions 32A, 32B until the horn block 13 is pushed in by a predetermined stroke or longer, and that respectively go into the notch grooves 34A, 34B when the horn block 13 is pushed in by the predetermined stroke or longer, to thereby restrict the first attachment pin 24A and the second attachment pin 24B from escaping. The escape restriction members 36A, 36B are each made of, for example, a spring steel wire, which is a conductive metal material, and are respectively biased in directions that cross the respective entry orbits of the first and second attachment pins 24A, 24B when the horn block 13 is attached.

In the case of this embodiment, a pair of the first attachment pin 24A and the first pin reception portion 27A, and a pair of the second attachment pin 24B and the second pin reception portion 27B function as a lock portion that restricts the horn block 13 from escaping.

Figure 5:
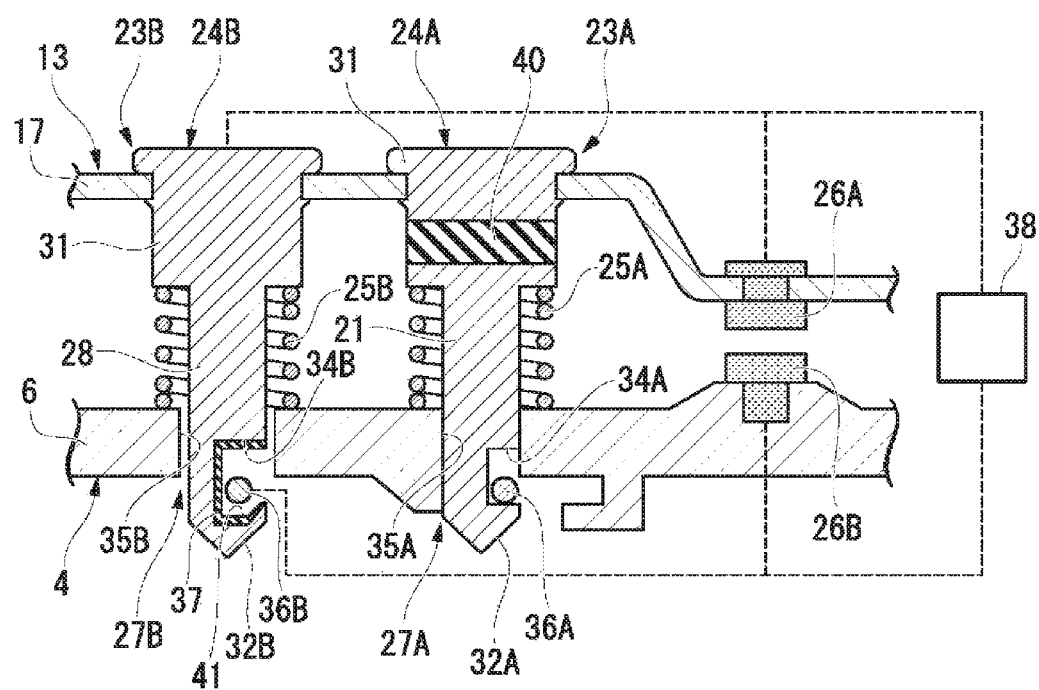
FIG. 5 is a schematic cross-sectional view for explaining a structure of a steering wheel according to a second embodiment of the present invention.
Figure 6:
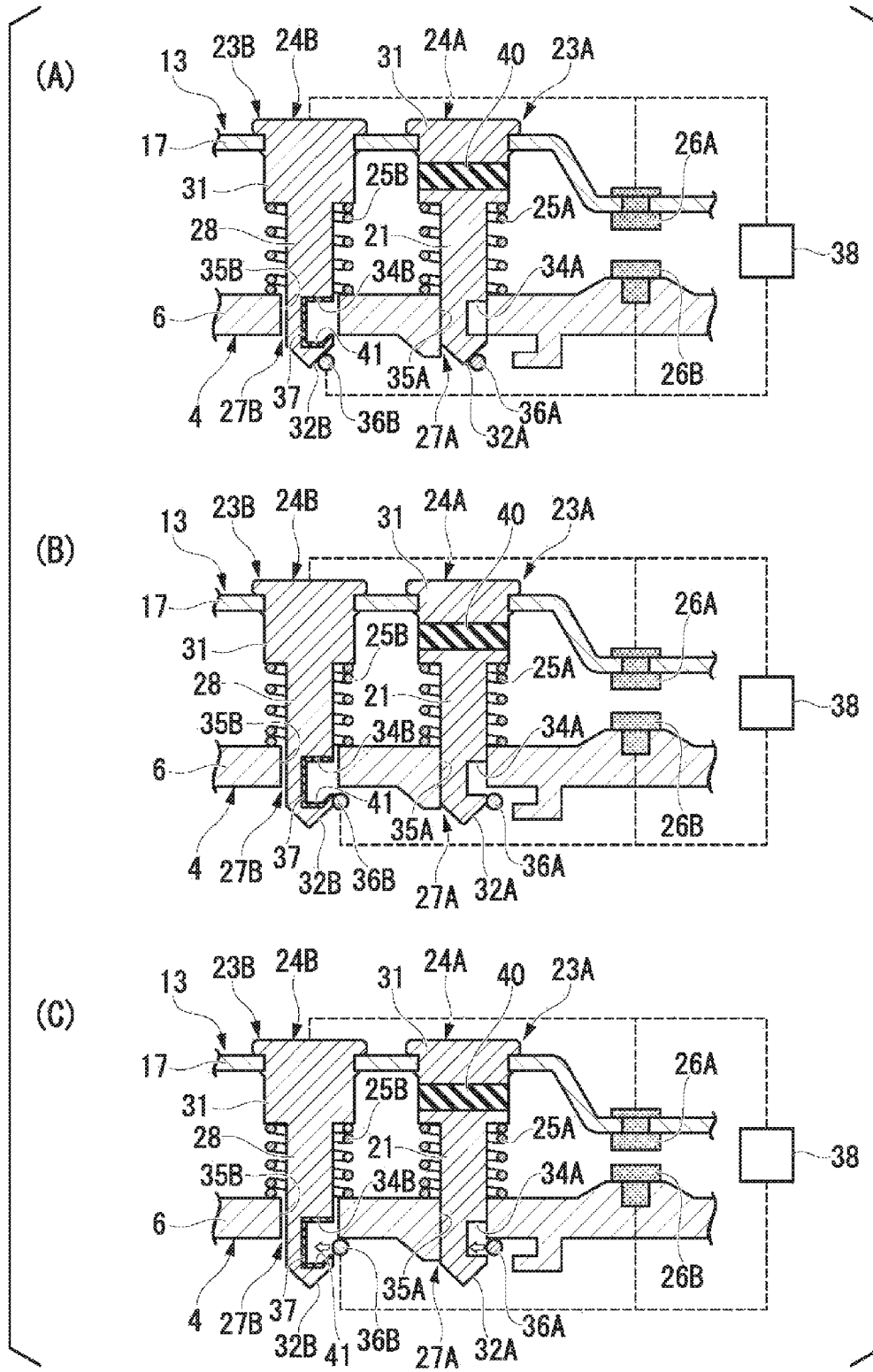
FIG. 6 are schematic cross-sectional diagrams showing how the steering wheel according to the second embodiment of the present invention is assembled, which is shown sequentially in (A), (B), and (C).

In FIG. 5 and FIG. 6, reference symbols 35A, 35B respectively denote support holes of the first pin reception portion 27A and the second pin reception portion 27B into which front end portions of the first attachment pin 24A and the second attachment pin 24B are respectively inserted. Between the support hole 35B of the second pin reception portion 27B and the shaft portion 28 of the second attachment pin 24B that is inserted into the support hole 35B, there is provided a comparatively large gap, which allows for a displacement of the second attachment pin 24B in a radial direction with respect to the steering wheel main unit 4 (cover portion 6).

A notch groove 34B of the second attachment pin 24B is provided with a curved recess portion 41 whose wall on a front end side of the shaft portion 28 is curved. Therefore, the notch groove 34B of the second attachment pin 24B is wider on the front end side of the shaft portion 28 than the notch groove 34A of the first attachment pin 24A by the recess portion 41. As shown in FIG. 5, in a state with the horn block 13 being attached to the steering wheel main unit 4, when the escape restriction member 36A of the first pin reception portion 27A is in abutment with an end surface in the notch groove 34 of the first attachment pin 24A and hence is restricted in its displacement, the escape restriction member 36B of the second pin reception portion 27B is in a non-contact state with an insulating material 37 of the notch groove 34B of the second attachment pin 24B.

In this embodiment, the second attachment pin 24B and the escape restriction member 36B of the second pin reception portion 27B are connected to a horn circuit 38. In attaching the horn block 13, it is possible to detect the completion of the locking of the horn block 13 by use of the horn circuits 38, similarly to the first embodiment.

Furthermore, in the case of this embodiment, the rubber elastic body 40 of the first attachment pin 24A together with the horn block 13 functions as a dynamic damper that suppresses a vibration of a steering wheel 1. Namely, the mass of the horn block 13 and the spring characteristic of the rubber elastic body 40 are set so that when a vibration is input to the steering wheel 1, the horn block 13 resonates with the vibration.

In the case where the horn block 13 is actually attached to the steering wheel main unit 4, firstly the horn block 13 is positioned with respect to the steering wheel main unit 4, and the first attachment pin 24A and the second attachment pin 24B, which are protrudingly provided through the horn block 13, are inserted into the corresponding support holes 35A, 35B on the steering wheel main unit 4 side, as shown in FIG. 6(A). At this time, while the return springs 25A, 25B in circumferential areas of the first and second attachment pins 24A, 24B are being compressed, the taper portions 32A, 32B on the front end sides of the attachment pins 24A, 24B pass through the support holes 35A, 35B.

When the horn block 13 is further pushed in, the escape restriction members 36A, 36B are brought into abutment respectively with the taper portions 32A, 32B of the first attachment pin 24A and the second attachment pin 24B, and are displaced in radially outward directions of the shaft portions 28 while being guided by the taper portions 32A, 32B, as shown in FIG. 6(A) and FIG. 6(B). At this time, the second attachment pin 24B and the escape restriction member 36B of the second pin reception portion 27B are in direct contact with each other, which turns the horn circuit 38 to the ON state to sound a horn.

Thus, when the horn block 13 is pushed in by a predetermined stroke or longer, the escape restriction members 36A, 36B are positioned respectively in the notch grooves 34A, 34B of the first attachment pin 24A and the second attachment pin 24B, as shown in FIG. 6(C), and go into the notch grooves 34A, 34B through their own spring reactive forces. At this time, the escape restriction member 36A of the first pin reception portion 27A is in abutment with the end surface in the notch groove 34A, and the escape restriction member 36B of the second pin reception portion 27B is in non-contact with a wall of the notch groove 34B. This turns the horn circuit 38 to the OFF state to halt the operation of the horn.

As described above, also in the case of the steering wheel structure according to this embodiment, in attaching the horn block 13, it is possible for an operator to easily check to see that the horn block 13 is securely locked on the steering wheel main unit 4, through the halt of the operating sound of the horn.

Furthermore, in the steering wheel structure according to this embodiment, the shaft portions 28 of the first and second attachment pins 24A, 24B are respectively provided with: the notch grooves 34A, 34B that open to the outer circumferential sides of the shaft portions 28; and the taper portions 32A, 32B that are arranged so as to be adjacent to the shaft front end sides of the notch grooves 34A, 34B, and the first and second pin reception portions 27A, 27B are respectively provided with the escape restriction members 36A, 36B that go into the notch grooves 34A, 34B when, in attaching the horn block 13, the horn block 13 is pushed in by a predetermined stroke or longer. Therefore, in attaching the horn block 13, with a simple operating of linearly pushing the horn block 13 in while resisting the forces of the return springs 25A, 25B, it is possible to easily attach the horn block 13 to the steering wheel main unit 4.

Furthermore, in the steering wheel structure according to this embodiment, when in expansion of an airbag 15 or on other occasions, a heavy load in an escape direction acts on the horn block 13 to cause the horn block 13 to be largely displaced in the escape direction further than a restriction position formed by the first attachment pin 24A and the escape restriction member 36A, the escape restriction member 36B is brought into abutment with the wall of the notch groove 34B of the second attachment pin 24B via the insulating material 37. Therefore, with this, it is possible to restrict an excessive displacement of the horn block 13 in the escape direction.

Furthermore, in the steering wheel structure according to this embodiment, in the default state in which the horn block 13 is attached to the steering wheel main unit 4, the second attachment pin 24B and the second pin reception portion 27B are in a non-contact state with each other, and the horn block 13 is supported by the steering wheel main unit 4 via the rubber elastic body 40 of the first attachment pin 24A. Therefore, with the mass of the horn block 13 and the spring characteristic of the rubber elastic body 40 being properly set, it is possible to allow these to function as a dynamic damper, to thereby reduce a vibration of the steering wheel 1.

Note that the present invention is not limited to the aforementioned embodiments, and various design modifications can be made without departing from the spirit or scope thereof. For example, the steering equipment component is not limited to the horn block. So long as it is a component to be attached to the steering wheel main unit, another component may be used. Furthermore, in the aforementioned embodiments, the attachment pins are protrudingly provided on the steering equipment component side, and the pin reception portions are provided on the steering wheel main unit side. However, conversely, the attachment pins may be protrudingly provided on the steering wheel main unit side, and the pin reception portions may be provided on the steering equipment component side.

BRIEF DESCRIPTION OF THE REFERENCE SYMBOLS 1 steering wheel
3 steering shaft
12: airbag module
13: horn block (steering equipment component)
24: attachment pin (lock portion, energizing portion)
25: return spring (reactive force imparting device)
27: pin reception portion (lock portion)
28: shaft portion
32: taper portion (guide wall portion)
34: notch groove (engaging recess portion)
36: escape restriction member (energizing portion)
37: insulating material
38: horn circuit
40: rubber elastic body
24A: first attachment pin
24B: second attachment pin
25A, 25B: return spring
27A: first pin reception portion
27B: second pin reception portion
32A, 32B: taper portion (guide wall portion)
34A, 34B: notch groove (engaging recess portion)
36A: escape restriction member
36B: escape restriction member (energizing portion)

The invention claimed is:

1. A steering wheel structure, comprising:
a steering wheel main unit that is supported by a steering shaft;
a horn circuit that sounds a warning sound at a time of a horn operation; and
a steering equipment component that is to be attached to the steering wheel main unit,
wherein the steering wheel main unit and the steering equipment component are provided with a lock portion with which the steering equipment component is retained on the steering wheel main unit when, in attaching the steering equipment component, the steering equipment component is pushed in the steering wheel main unit by a predetermined stroke or longer,
wherein the steering wheel main unit and the steering equipment component are each provided with an energizing portion, the energizing portions energize the horn circuit through mutual contact thereof,
wherein the lock portion is provided with a contact structure in which in attaching the steering equipment component, the energizing portions are in contact connection to each other until the steering equipment component is pushed in by the predetermined stroke or longer, and in which the contact connection between the energizing portions is interrupted when the steering equipment component is pushed in by the predetermined stroke or longer,
wherein the lock portion comprises: an attachment pin that is protrudingly provided through a first of the steering equipment component and the steering wheel main unit; and a pin reception portion that is provided in a second of the steering equipment component and the steering wheel main unit and receives a front end portion of the attachment pin,
wherein a shaft portion of the attachment pin has: an engaging recess portion that opens to an outer circumferential side of the shaft portion; and a guide wall portion that is arranged so as to be adjacent to a shaft front end side of the engaging recess portion, and
wherein the pin reception portion is provided with an escape restriction member that, in attaching the steering equipment component, is in abutment with the guide wall portion until the steering equipment component is pushed in by the predetermined stroke or longer, and that goes into the engaging recess portion to restrict the attachment pin from escaping when the steering equipment component is pushed in by the predetermined stroke or longer.

2. The steering wheel structure according to claim 1,
wherein the attachment pin and the escape restriction member are formed of a conductive material and function as the energizing portion, and
wherein in the engaging recess portion, an insulating material is arranged.

3. The steering wheel structure according to claim 1,
wherein the guide wall portion is formed in a tapered shape whose diameter reduces toward a front end side of the shaft portion of the attachment pin,
wherein the escape restriction member is biased in a direction that crosses an entry orbit of the attachment pin when the steering equipment component is attached, and
wherein between the steering equipment component and the steering wheel main unit, a reactive force imparting device is provided that imparts a reactive force that resists the push-in of the steering equipment component.

4. The steering wheel structure according to claim 1,
wherein a first of the steering equipment component and the steering wheel main unit is protrudingly provided with: a first attachment pin in which a rubber elastic body is interposed partly in an axial direction; and a second attachment pin whose whole area in the axial direction is formed of a conductive material,
wherein a second of the steering equipment component and the steering wheel main unit is provided with: a first pin reception portion that receives a front end portion of the first attachment pin; and a second pin reception portion that receives a front end portion of the second attachment pin,
wherein a pair of the first attachment pin and the first pin reception portion, and a pair of the second attachment pin and the second pin reception portion each function as the lock portion,
wherein a shaft portion of the second attachment pin has: an engaging recess portion that opens to an outer circumferential side of the shaft portion; and a guide wall portion that is arranged so as to be adjacent to a shaft front end side of the engaging recess portion,
wherein the second pin reception portion is provided with an escape restriction member that, in attaching the steering equipment component, is in abutment with the guide wall portion until the steering equipment component is pushed in by the predetermined stroke or longer, and that goes into the engaging recess portion to restrict the second attachment pin from escaping when the steering equipment component is pushed in by the predetermined stroke or longer, and wherein the escape restriction member is formed of a conductive material and functions together with the second attachment pin as the energizing portions, and also the escape restriction member causes a contact connection to the second attachment pin to be interrupted when having gone into the engaging recess portion of the second attachment pin.

5. The steering wheel structure according to claim 4, wherein in the escape restriction member of the second pin reception portion that has gone into the engaging recess portion of the second attachment pin, when the steering equipment component is displaced in an escape direction further than an escape restriction position formed by the first attachment pin and the first pin reception portion, a wall of the engaging recess portion of the second attachment pin and the escape restriction member of the second pin reception portion are brought into abutment with each other.

6. The steering wheel structure according to claim 4, wherein in a default state in which the steering equipment component is attached to the steering wheel main unit, the second attachment pin and the second pin reception portion are in a non-contact state.

7. The steering wheel structure according to claim 4, wherein a shaft portion of the first attachment pin has: an engaging recess portion that opens to an outer circumferential side of the shaft portion; and a guide wall portion that is arranged so as to be adjacent to a shaft front end side of the engaging recess portion, wherein the guide wall portion of each of the first attachment pin and the second attachment pin is formed in a tapered shape whose diameter decreases toward a front end side of each shaft portion, wherein the first pin reception portion is provided with an escape restriction member that, in attaching the steering equipment component, is in abutment with the guide wall portion of the first attachment pin until the steering equipment component is pushed in by the predetermined stroke or longer, and that goes into the engaging recess portion of the first attachment pin to restrict the first attachment pin from escaping when the steering equipment component is pushed in by the predetermined stroke or longer, wherein the escape restriction member of the first pin reception portion is biased in a direction that crosses an entry orbit of the first attachment pin when the steering equipment component is attached, wherein the escape restriction member of the second pin reception portion is biased in a direction that crosses an entry orbit of the second attachment pin when the steering equipment component is attached, and wherein between the steering equipment component and the steering wheel main unit, reactive force imparting devices are provided that impart a reactive force that resists the push-in of the steering equipment component.

8. The steering wheel structure according to claim 1, wherein the steering equipment component is a horn block in which a horn operation portion and an airbag module are assembled.

9. The steering wheel structure according to claim 2, wherein the guide wall portion is formed in a tapered shape whose diameter reduces toward a front end side of the shaft portion of the attachment pin, wherein the escape restriction member is biased in a direction that crosses an entry orbit of the attachment pin when the steering equipment component is attached, and wherein between the steering equipment component and the steering wheel main unit, a reactive force imparting device is provided that imparts a reactive force that resists the push-in of the steering equipment component.

10. The steering wheel structure according to claim 5, wherein in a default state in which the steering equipment component is attached to the steering wheel main unit, the second attachment pin and the second pin reception portion are in a non-contact state.

11. The steering wheel structure according to claim 5, wherein a shaft portion of the first attachment pin has: an engaging recess portion that opens to an outer circumferential side of the shaft portion; and a guide wall portion that is arranged so as to be adjacent to a shaft front end side of the engaging recess portion, wherein the guide wall portion of each of the first attachment pin and the second attachment pin is formed in a tapered shape whose diameter decreases toward a front end side of each shaft portion, wherein the first pin reception portion is provided with an escape restriction member that, in attaching the steering equipment component, is in abutment with the guide wall portion of the first attachment pin until the steering equipment component is pushed in by the predetermined stroke or longer, and that goes into the engaging recess portion of the first attachment pin to restrict the first attachment pin from escaping when the steering equipment component is pushed in by the predetermined stroke or longer, wherein the escape restriction member of the first pin reception portion is biased in a direction that crosses an entry orbit of the first attachment pin when the steering equipment component is attached, wherein the escape restriction member of the second pin reception portion is biased in a direction that crosses an entry orbit of the second attachment pin when the steering equipment component is attached, and wherein between the steering equipment component and the steering wheel main unit, reactive force imparting devices are provided that impart a reactive force that resists the push-in of the steering equipment component.

12. The steering wheel structure according to claim 6, wherein a shaft portion of the first attachment pin has: an engaging recess portion that opens to an outer circumferential side of the shaft portion; and a guide wall portion that is arranged so as to be adjacent to a shaft front end side of the engaging recess portion, wherein the guide wall portion of each of the first attachment pin and the second attachment pin is formed in a tapered shape whose diameter decreases toward a front end side of each shaft portion, wherein the first pin reception portion is provided with an escape restriction member that, in attaching the steering equipment component, is in abutment with the guide wall portion of the first attachment pin until the steering equipment component is pushed in by the predetermined stroke or longer, and that goes into the engaging recess portion of the first attachment pin to restrict the first attachment pin from escaping when the steering equipment component is pushed in by the predetermined stroke or longer, wherein the escape restriction member of the first pin reception portion is biased in a direction that crosses an entry orbit of the first attachment pin when the steering equipment component is attached, wherein the escape restriction member of the second pin reception portion is biased in a direction that crosses an entry orbit of the second attachment pin when the steering equipment component is attached, and wherein between the steering equipment component and the steering wheel main unit, reactive force imparting devices are provided that impart a reactive force that resists the push-in of the steering equipment component.

13. The steering wheel structure according to claim 10, wherein a shaft portion of the first attachment pin has: an engaging recess portion that opens to an outer circumferential side of the shaft portion; and a guide wall portion that is arranged so as to be adjacent to a shaft front end side of the engaging recess portion, wherein the guide wall portion of each of the first attachment pin and the second attachment pin is formed in a tapered shape whose diameter decreases toward a front end side of each shaft portion, wherein the first pin reception portion is provided with an escape restriction member that, in attaching the steering equipment component, is in abutment with the guide wall portion of the first attachment pin until the steering equipment component is pushed in by the predetermined stroke or longer, and that goes into the engaging recess portion of the first attachment pin to restrict the first attachment pin from escaping when the steering equipment component is pushed in by the predetermined stroke or longer, wherein the escape restriction member of the first pin reception portion is biased in a direction that crosses an entry orbit of the first attachment pin when the steering equipment component is attached, wherein the escape restriction member of the second pin reception portion is biased in a direction that crosses an entry orbit of the second attachment pin when the steering equipment component is attached, and wherein between the steering equipment component and the steering wheel main unit, reactive force imparting devices are provided that impart a reactive force that resists the push-in of the steering equipment component.

* * * * *